United States Patent [19]

Kelkar et al.

[11] Patent Number: 5,138,659
[45] Date of Patent: Aug. 11, 1992

[54] CONVERSION OF TELEVISION SIGNAL FORMATS WITH RETENTION OF COMMON CONTROL DATA STREAM

[75] Inventors: Kris Kelkar; Christopher J. Bennett, both of San Diego, Calif.

[73] Assignee: General Instrument Corporation, Hatboro, Pa.

[21] Appl. No.: 694,796

[22] Filed: May 2, 1991

[51] Int. Cl.⁵ ............................................. H04N 7/167
[52] U.S. Cl. ....................................... 380/20; 358/141
[58] Field of Search .................... 380/20; 358/141, 140

[56] References Cited

U.S. PATENT DOCUMENTS

| | | | |
|---|---|---|---|
| 4,747,138 | 5/1988 | Marie et al. | 380/20 |
| 4,833,710 | 5/1989 | Hirashima | 380/20 |
| 5,046,090 | 9/1991 | Walker et al. | 380/20 |
| 5,051,827 | 9/1991 | Fairhurst | 358/141 |

OTHER PUBLICATIONS

Brochure—Philips BSB Satellite Receiver Model STU902.
Brochure—CEL Electronics Ltd. Model P156-2 Television Standards Converter.
Brochure—Video International Model DTC 1504 Television Standards Converter.

Primary Examiner—Thomas H. Tarcza
Assistant Examiner—David Cain
Attorney, Agent, or Firm—Barry R. Lipsitz

[57] ABSTRACT

Television signals are converted from a first format to a plurality of different formats while retaining a common control data stream. A first television signal in a first format is separated into a first signal portion carrying television information and a second signal portion carrying control data. The first signal portion is reformatted into a second format. The second signal portion is combined with the reformatted first signal portion to provide a second television signal. In this manner, a plurality of television signals having different formats can be transmitted with common control data, e.g., for controlling access to television programming.

30 Claims, 3 Drawing Sheets

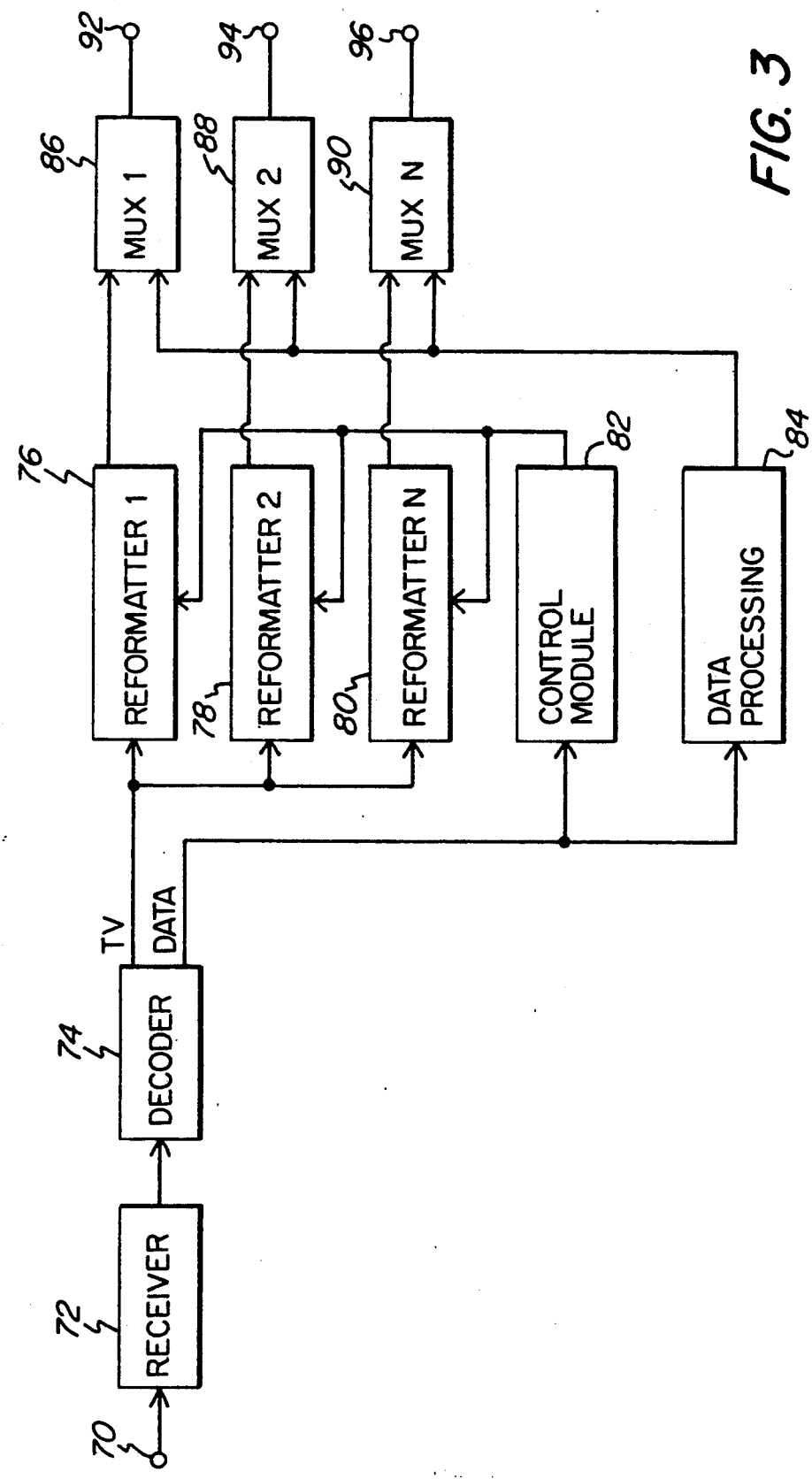

CONVERSION OF TELEVISION SIGNAL FORMATS WITH RETENTION OF COMMON CONTROL DATA STREAM

BACKGROUND OF THE INVENTION

The present invention relates to television signal distribution, and more particularly to a method and apparatus for converting between different television signal formats while retaining a common control data stream.

Television signals are conventionally transmitted in analog form according to various standards adopted by particular countries. For example, the United States has adopted the standards of the National Television System Committee ("NTSC") while most European countries have adopted either PAL (phase alternating line) or SECAM standards. A family of multiplexed analog component ("MAC") systems, in particular C-MAC, D2-MAC, and D-MAC have been proposed, mainly for direct broadcast satellite service ("DBS") applications wherein television signals are broadcast directly from a satellite to an earth station operated by the end user. The various MAC systems differ mainly in how the digitized sound is realized, and all need more bandwidth than an NTSC signal. Entirely new color television systems, not constrained by the limitations of the systems noted above, may be developed for high definition television ("HDTV"). The main attributes of HDTV are a new aspect ratio of picture width to height, a substantially increased number of scan lines for more vertical resolution, and a greater video bandwidth for more horizontal resolution. Some proposed HDTV systems achieve a bandwidth comparable to that for NTSC television signals by using digital compression techniques.

The various television systems identified above are all incompatible. Therefore, a programmer such as Home Box Office ("HBO") that desires to serve markets in which various standards are used, must live with the added complexity of generating a plurality of incompatible signal formats for communication via a broadcast media such as satellite, cable, or terrestrial transmission. Since programmers of premium television services must control access to their signals in order to derive subscriber revenues, an access control data stream is transmitted with the television information to permit authorized subscribers to receive particular programs via a descrambler. In the past, the different television broadcast systems each used a different access control data stream to enable authorized subscribers to receive particular television programs. Thus, signal programmers must contend with different access control schemes as well as different broadcast formats. This requirement increases the complexity and cost of the equipment required by a programmer.

Access control systems for television signals provided in a single format are well known. One such system is disclosed in U.S. Pat. No. 4,613,901 to Gilhousen, et al entitled "Signal Encryption and Distribution System for Controlling Scrambling and Selective Remote Descrambling of Television Signals", incorporated herein by reference. In the Gilhousen, et al system, a unique encryption key stream is generated for scrambling a television signal. The scrambled television signal is transmitted together with control data including various cryptographic keys. At each descrambler authorized to receive a particular television signal, the encryption key stream is reproduced for use in descrambling the television signal.

Other selective subscription descrambling systems are disclosed in Gilhousen, et al U.S. Pat. Nos. 4,712,238 and 4,792,973. These patents provide improved systems for enabling descrambling of a received scrambled signal on an impulse-purchase basis. U.S. Pat. No. 4,634,808 to Moerder discloses a system for reproducing a key signal in a descrambler that is unique to the descrambler, and was used in encrypting a key signal that must be decrypted for use in descrambling a television signal.

It would be advantageous to provide a system for converting television signals of one format to one or more other formats while maintaining a common control data stream among the different formats. This would enable simplification of a television signal distribution system, by permitting the same hardware and software to be used to provide access control for television signals broadcast in any format.

The present invention provides a system having the aforementioned advantages.

SUMMARY OF THE INVENTION

In accordance with the present invention, a method and apparatus are provided for converting television signals to provide a plurality of signal formats while retaining a common control data stream among the different formats. A first television signal in a first format is separated into a first signal portion carrying television information and a second signal portion carrying control data. The first signal portion is reformatted into a second format. The second signal portion is combined with the reformatted first signal portion to provide a second television signal. In this manner, the first and second television signals contain common control data.

By concurrently transmitting the first and second television signals, access to television programs by receivers operating in either the first or second format is provided. The common control data provides or denies access to particular television programs regardless of the television format in which the program signals are received. Authorized subscribers will be permitted to view a particular program, and access by unauthorized subscribers will be denied.

In an illustrated embodiment, the first signal portion of the first television signal is descrambled before it is reformatted into the second format. The first signal portion can be rescrambled after descrambling in a manner compatible with the second format.

The first format in which a television signal is broadcast can be, for example, any of the MAC, PAL, SECAM, NTSC, and HDTV television formats. The second format can be another of said MAC, PAL, SECAM, NTSC, and HDTV television formats.

In accordance with an expanded embodiment of the present invention, the first signal portion of the first television signal is reformatted into at least one additional format. The second signal portion is combined with the additional reformatted first signal portion to provide at least one additional television signal. In this manner, a television signal in a first format can be provided in any number of different formats all containing common control data.

In an illustrated embodiment, secret information is derived from the first television signal for use in descrambling and rescrambling said first signal portion. Where the second signal portion is transmitted in an encrypted form, it can be decrypted and reencrypted in a manner compatible with the second format before it is combined with the reformatted first signal portion. Secret information derived from the first television signal can also be used in connection with the decryption and reencryption of the second signal portion.

In the present disclosure, the terms "descrambling" and "rescrambling" are used in connection with the television information portions (i.e., video and audio) of a television signal. It should be appreciated that the video and audio information can be provided in either an analog or digital format. For example, satellite television signals are conventionally transmitted with analog video and digital audio. HDTV signals, on the other hand, are expected to be fully digital in nature.

The terms "decrypting" and "encrypting" are used herein in connection with the control data portions of a signal, which are in digital form.

BRIEF DESCRIPTION OF THE DRAWINGS

FIG. 3 is a block diagram of an alternate embodiment wherein television signals in a first format are converted to a plurality of different formats, all retaining a common control data stream.

DETAILED DESCRIPTION OF THE INVENTION

The present invention provides a method and apparatus for converting a television signal containing a digital access control data stream from one format to another, while preserving all or part of the access control data stream. The term "format" as used herein refers to modulating and encoding formats such as those used in broadcasting NTSC, PAL, SECAM, MAC, and HDTV television signals. Typically, the digital access control data stream is an addressable data stream that has been modulated into the television waveform for purposes of implementing a conditional access control system that limits access to programming. It should be appreciated that the invention is also applicable to other types of data streams, and is not limited solely to television program access control.

Figure 1:
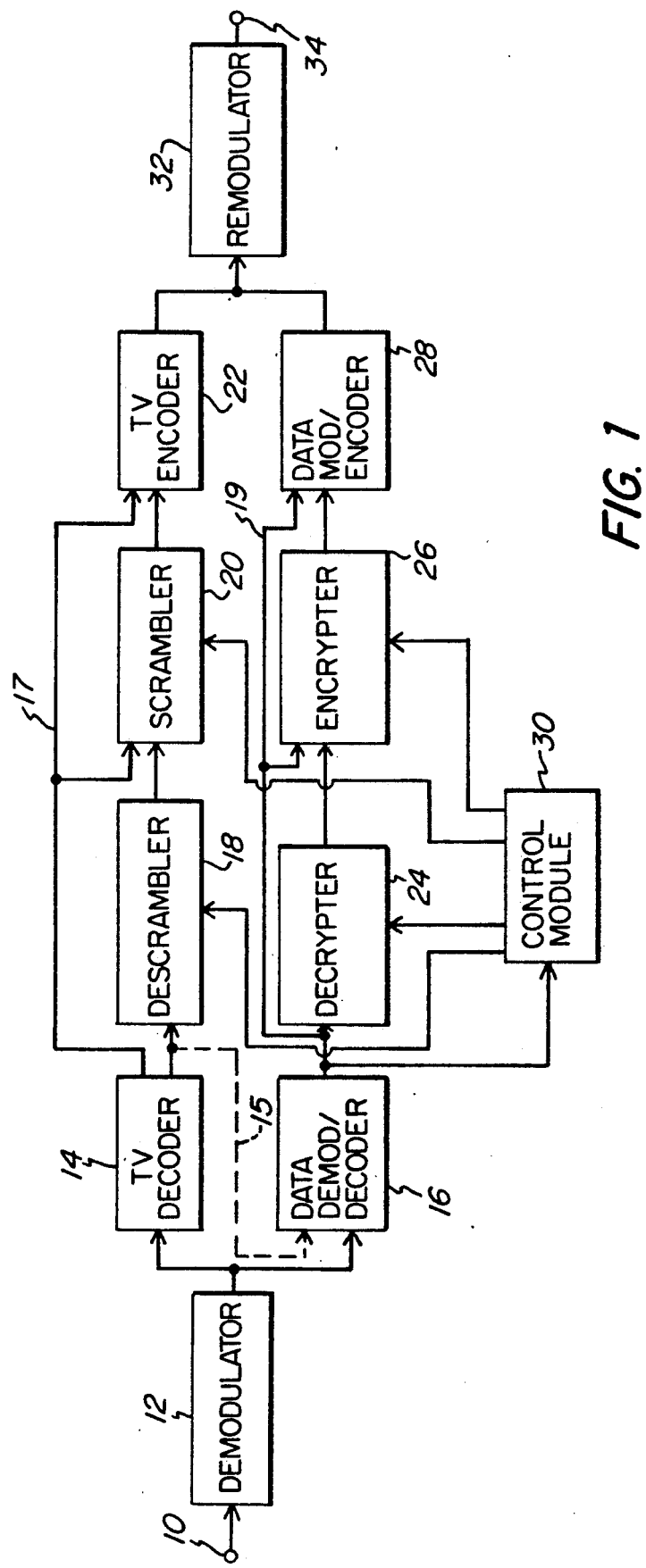
FIG. 1 is a block diagram of a general embodiment of the present invention illustrating the conversion of television signals in one format to another format while retaining a common control data stream among the different formats.

FIG. 1 is a general block diagram of apparatus in accordance with the present invention. A television signal in a first format is input at terminal 10, and contains in addition to its video and audio components, a digital access control data stream that is modulated in the television signal using a modulation scheme that does not violate the specifications of the first format. In addition to the video and audio components, which include video luminescence, video chrominance, and one or more audio channels, the television signal can also include auxiliary data or video helper signals containing temporal information, frequency information, or panels of the video signal. The apparatus illustrated in FIG. 1 converts the television signal from the first format to an equivalent television signal in a second format. The signal in the second format contains all or a portion of the television information and all or a portion of the access control data stream contained in the first format.

The television signal input at terminal 10 is coupled to a demodulator 12 that is a conventional device for demodulating the signal from a frequency suitable for transmission or an intermediate frequency to a frequency that is more suitable for processing. The demodulated signal is then input to a TV decoder 14 and a data demodulator/decoder 16. The TV decoder is a conventional circuit that decodes the television signal in the first format into its components (i.e., video components, audio components, auxiliary data, and/or video helper signals). Decoder 14 is specifically adapted to decode television signals in the first format.

Data demodulator/decoder 16 is a conventional circuit that extracts the digital access control data stream contained in the television signal in the first format. The particular data demodulator/decoder used will be determined by the modulation format that modulates the data into the television signal input at terminal 10. The combination of demodulator 12, television decoder 14, and data demodulator/decoder 16 separate the television signal input at terminal 10 into a first signal portion carrying television information and output from decoder 14, and a second signal portion carrying control data and output from decoder 16.

The television information output from decoder 14 is input to a descrambler 18. Descrambler 18 is a conventional descrambler that descrambles any scrambled components contained in the television signal input at terminal 10. As noted above, these components can be either analog or digital signals. In order to perform the descrambling, a control module 30 derives secret information (e.g., cryptographic keys) from data contained in the input television signal, and communicates the secret information to the descrambler. The information used by control module 30 to derive the secret information can reside anywhere in the input television signal. If the information resides in the television information portion of the signal, it is decoded by television decoder 14 and passed to data demodulator/decoder 16 via dashed line 15. Then, control module 30 obtains the decoded information at the output of data demodulator/decoder 16. If the data required to derive the secret information is carried in the control data portion of the input television signal, it is decoded directly by decoder 16 for input to control module 30.

The descrambled television signal, still in the first format, is output from descrambler 18 to a scrambler 20. Scrambler 20 is a conventional scrambling circuit that rescrambles the television components in a manner compatible with a second format to which the television signal will be converted. Like descrambler 18, scrambler 20 operates on the basis of secret information received from control module 30.

The rescrambled signal output from scrambler 20 is input to a television encoder 22 that comprises a conventional circuit for encoding all or a portion of the television components that were originally transmitted in the first format into a second format. Examples of commercially available television encoders are found in the Philips BSB Satellite Receiver model STU902 that converts MAC signals to PAL signals, the CEL Electronics Ltd. model P156-2 television standards converter that converts between SECAM/PAL and NTSC signals, and the Video International model DTC 1504 television standards converter that converts between PAL and NTSC.

Descrambler 18 and scrambler 20 are not necessary in all embodiments of the present invention. In particular, where the television signal input to terminal 10 is not scrambled, descrambler 18 and scrambler 20 can be bypassed as indicated by line 17. Alternatively, where the signal in the first format is not scrambled, but the television signal in the second format is to be scrambled, descrambler 18 can be eliminated while scrambler 20 is provided in the signal conversion apparatus. Similarly, a descrambler 18 can be provided without a scrambler 20.

Data demodulator/decoder 16 outputs the control data portion of the input television signal. In the event the control data is encrypted in a manner that is incompatible with the second format, a decrypter 24 is provided to decrypt the digital access control data stream. An encrypter 26 reencrypts the decrypted data from decrypter 24 in a manner that is compatible with the second format. Decrypter 24 and encrypter 26 receive secret information from control module 30, in order to properly decrypt and encrypt the data. The secret information is derived by control module 30 from the input television signal as described above. In an embodiment where neither of the first and second formats or only one of the formats uses decrypted data, decrypter 24 and/or encrypter 26 can be bypassed as illustrated at line 19.

The control data stream is input to data modulator/encoder 28, that modulates the digital data stream into the television signal in appropriate places in accordance with the requirements of the second format. The resultant television signal in the second format, including both video and audio components and the common control data is then input to a remodulator 32. This device modulates the television signal in the second format from the frequency used in the conversion process to a frequency more suitable for transmission or for interfacing to transmission equipment. The remodulated signal is output on terminal 34.

Figure 2:
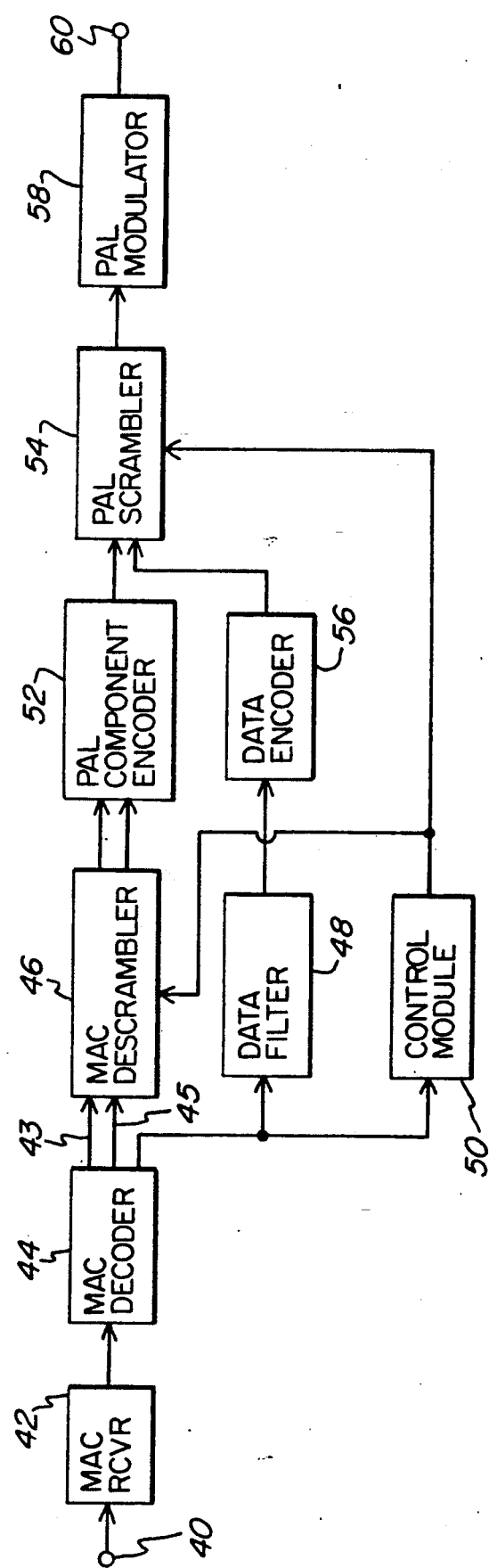
FIG. 2 is a block diagram of a specific embodiment in which television signals in a MAC format are converted to a PAL format.

FIG. 2 illustrates a specific embodiment of the present invention for converting MAC formatted television signals to PAL formatted television signals, while maintaining common control data between the MAC and PAL versions. Television programs are encoded in the MAC format with the addition of an access control data stream into the MAC signal. This signal can be received and viewed by a population of MAC receivers containing a conditional access control system that utilizes the access control data stream. An example of such an access control system is the VideoCipher II system marketed by the VideoCipher Division of General Instrument Corporation, San Diego, Calif., U.S.A.

The apparatus of FIG. 2 generates a PAL signal with the very same conditional access information as the input MAC signal. This allows a population of PAL receivers using the conditional access control system to view programming that originated in the MAC format. Furthermore, the apparatus in accordance with the present invention allows a system operator to transmit the television programs without any need to distinguish between PAL receivers and MAC receivers in the distribution system. The operator can treat both the PAL and MAC receiver population as a single population of receivers using the same conditional access control system. By providing a control system that is independent of the various transmission formats, programmers are able to reach a larger population of receivers using the same conditional access control system.

A modulated MAC signal containing basic television components and an access control stream is input to terminal 40 from a terrestrial, satellite or cable distribution system. A MAC receiver 42 demodulates the signal to baseband MAC. A MAC decoder 44 then extracts the components in the signal (which in this case include luminance, chrominance, and audio) and the access control stream. The access control stream is sent to an access control module 50, that obtains and derives the information necessary for a MAC descrambler 46 to convert the received television signal components into clear, unscrambled television components. MAC descrambler 46 receives analog video components from MAC decoder 44 via line 43, and receives digital audio components via line 45. The descrambled components output from MAC descrambler 46 are input to a PAL component encoder 52, that encodes them into a PAL waveform. The PAL waveform is then scrambled by PAL scrambler 54 under control of the control module 50. A data filter 48 can be provided to remove MAC only authorizations and overhead information that is specific to the MAC format. The access control stream is then modulated into portions of the PAL waveform by a data encoder 56 and PAL scrambler 54. The resulting signal is remodulated in PAL modulator 58 and transmitted to PAL receivers via terrestrial, satellite or cable transmission systems coupled to output terminal 60.

FIG. 3 illustrates a multiple format conversion apparatus in accordance with the present invention. A television signal in a first format is input at terminal 70. Receiver 72 demodulates the signal to baseband for output to a decoder 74. The demodulated baseband signal is separated into a first signal portion carrying television information and a second signal portion carrying control data. The television information is input to each of a plurality of reformatters 76, 78, 80. Each reformatter converts the television information from the first format to a different format as described in connection with FIGS. 1 and 2 above. Control module 82 provides the secret information necessary to enable reformatters 76, 78, 80 to descramble and/or scramble the television information. Data processing circuitry 84 is equivalent to the data filter 48 and data encoder 56 of FIG. 2.

The outputs of each of the reformatters comprise the television information in different formats. The reformatted information from each of reformatters 76, 78, 80 is input to a corresponding multiplexer 86, 88, 90. These multiplexers combine the reformatted television information with the common control data from data processing circuitry 84. Output terminal 92 of multiplexer 86 contains the television information in one format together with the common control data. Output terminal 94 of multiplexer 88 contains the television information in another format together with the common control data. Output terminal 96 of multiplexer N contains the television information in yet another format combined with the common control data. A television signal in a first format can be converted to any number of additional formats in this manner, with each format containing a common control data stream.

It should now be appreciated that the present invention provides a method and apparatus for converting television signals from one format to one or more different formats while preserving a digital access control data stream for use with all of the formats. Each of the output formats can contain all of the common control data, or only the portions thereof necessary to authorize receivers for the particular format. System operators and programmers that distribute signals to subscribers having receivers that operate using the different formats can use the same access control hardware and software, even though the television information is transmitted in a variety of different formats.

Although the invention has been described in connection with various preferred embodiments, those skilled in the art will appreciate that numerous adaptations and modifications may be made thereto without departing from the spirit and scope of the invention, as set forth in the following claims.

What is claimed is:

1. A method for converting television signals to provide a plurality of different television formats while retaining a common control data stream among the different formats comprising the steps of:
   separating a first television signal in a first television format into a first signal portion carrying television information and a second signal portion carrying control data;
   reformatting said first signal portion into a second television format; and
   combining said second signal portion with said reformatted first signal portion to provide a second television signal;
   whereby said first and second television signals have different television formats but contain common control data.

2. A method in accordance with claim 1 comprising the further step of concurrently transmitting said first and second television signals.

3. A method in accordance with claim 1 comprising the further step of descrambling said first signal portion before said reformatting step.

4. A method in accordance with claim 3 comprising the further step of rescrambling said first signal portion after said descrambling step in a manner compatible with said second format.

5. A method in accordance with claim 4 comprising the further step of deriving secret information from said first television signal for use in descrambling and rescrambling said first signal portion.

6. A method in accordance with claim 4 comprising the further steps of decrypting and reencrypting said second signal portion before said combining step in a manner compatible with said second format.

7. A method in accordance with claim 6 comprising the further step of deriving secret information from said first television signal for use in descrambling and rescrambling said first signal portion and for use in decrypting and reencrypting said second signal portion.

8. A method in accordance with claim 1 comprising the further steps of decrypting and reencrypting said second signal portion before said combining step in a manner compatible with said second format.

9. A method in accordance with claim 8 comprising the further step of deriving secret information from said first television signal for use in decrypting and reencrypting said second signal portion.

10. A method in accordance with claim 1 wherein said common control data provides access control for said first and second television signals at corresponding television signal decoders.

11. A method in accordance with claim 1 wherein said first format is one of a MAC, PAL, SECAM, NTSC and HDTV television format and said second format is another of said MAC, PAL, SECAM, NTSC and HDTV television formats.

12. A method in accordance with claim 1 comprising the further steps of:
    reformatting said first signal portion into at least one additional format; and
    combining said second signal portion with said additional reformatted first signal portion to provide at least one additional television signal;
    whereby said first, second and additional television signals all contain common control data.

13. A method in accordance with claim 12 comprising the further step of concurrently transmitting said first, second and additional television signals.

14. A method in accordance with claim 1 comprising the further step of filtering said second signal portion before said combining step to delete a portion of said control data.

15. Apparatus for converting television signals to provide a plurality of different television formats while retaining a common control data stream among the different formats comprising:
    means for separating a first television signal in a first television format into a first signal portion carrying television information and a second signal portion carrying control data;
    means coupled to an output of said separating means for reformatting said first signal portion into a second television format; and
    means coupled to an output of said reformatting means for combining said second signal portion with said reformatted first signal portion to provide a second television signal;
    whereby said first and second television signals have different television formats but contain common control data.

16. Apparatus in accordance with claim 15 further comprising:
    means for concurrently transmitting said first and second television signals to a plurality of decoders responsive to said common control data.

17. Apparatus in accordance with claim 15 further comprising: means coupled between said separating and reformatting means for descrambling said first signal portion.

18. Apparatus in accordance with claim 17 further comprising: means operatively associated with said reformatting means for rescrambling said first signal portion in a manner compatible with said second format.

19. Apparatus in accordance with claim 18 further comprising: means for deriving secret information from said first television signal for use in descrambling and rescrambling said first signal portion.

20. Apparatus in accordance with claim 18 further comprising: means coupled between said separating and combining means for decrypting and reencrypting said second signal portion in a manner compatible with said second format.

21. Apparatus in accordance with claim 20 further comprising: means for deriving secret information from said first television signal for use in descrambling and rescrambling said first signal portion and for use in decrypting and reencrypting said second signal portion.

22. Apparatus in accordance with claim 15 further comprising: means coupled between said separating and combining means for decrypting and reencrypting said second signal portion in a manner compatible with said second format.

23. Apparatus in accordance with claim 22 further comprising: means for deriving secret information from said first television signal for use in decrypting and reencrypting said second signal portion.

24. Apparatus in accordance with claim 15 wherein said common control data provides access control for said first and second television signals at corresponding television signal decoders.

25. Apparatus in accordance with claim 15 wherein said first format is one of a MAC, PAL, SECAM, NTSC and HDTV television format and said second format is another of said MAC, PAL, SECAM, NTSC and HDTV television formats.

26. Apparatus in accordance with claim 15 further comprising:
 means for reformatting said first signal portion into at least one additional format; and
 means for combining said second signal portion with said additional reformatted first signal portion to provide at least one additional television signal;
 whereby said first, second and additional television signals all contain common control data.

27. Apparatus in accordance with claim 26 further comprising: means for concurrently transmitting said first, second and additional television signals to a plurality of decoders responsive to said common control data for providing or denying access to said first signal portion.

28. Apparatus in accordance with claim 15 further comprising means, coupled between said separating and combining means, for filtering said second signal portion to remove a portion of said control data.

29. Apparatus in accordance with claim 15 wherein said reformatting means convert color information in said first signal portion into a different format.

30. Apparatus in accordance with claim 15 wherein said reformatting means convert a line rate of said first signal to a different line rate.

* * * * *